(12) United States Patent
Ravinathan et al.

(10) Patent No.: US 12,118,537 B2
(45) Date of Patent: *Oct. 15, 2024

(54) METHOD AND SYSTEM FOR MERCHANT ACCEPTANCE OF CRYPTOCURRENCY VIA PAYMENT RAILS

(71) Applicant: MASTERCARD ASIA/PACIFIC PTE. LTD., Singapore (SG)

(72) Inventors: Srinath Ravinathan, Singapore (SG); Donghao Huang, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,140

(22) Filed: Jan. 27, 2023

(65) Prior Publication Data

US 2023/0177491 A1 Jun. 8, 2023

Related U.S. Application Data

(63) Continuation of application No. 16/946,492, filed on Jun. 24, 2020, now Pat. No. 11,587,071.

(51) Int. Cl.
*G06Q 20/36* (2012.01)
*G06Q 20/06* (2012.01)
(Continued)

(52) U.S. Cl.
CPC ..... *G06Q 20/3674* (2013.01); *G06Q 20/0655* (2013.01); *G06Q 20/202* (2013.01);
(Continued)

(58) Field of Classification Search
CPC .. G06Q 20/00–425; G06Q 2220/00–18; H04L 9/00–50; H04L 2209/00–88
See application file for complete search history.

(56) References Cited

U.S. PATENT DOCUMENTS 10,055,715 B1 * 8/2018 Grassadonia ...... G06Q 20/3674
10,171,961 B1 1/2019 Yuen et al.
(Continued)

FOREIGN PATENT DOCUMENTS

| CN | 110633980 A | 12/2019 |
| WO | 2020025141 A1 | 2/2020 |
| WO | 2020109972 A1 | 6/2020 |

OTHER PUBLICATIONS

Notification of Transmittal of the International Search Report (Forms PCT/ISA/220 and PCT/ISA/210) and the Written Opinion of the International Searching Authority (Form PCT/ISA/237) issued on Jul. 13, 2021, by the Intellectual Property Office of Signapore in corresponding International Application No. PCT/SG2021/050283 (8 pages).

(Continued)

*Primary Examiner* — Chenyuh Kuo
(74) *Attorney, Agent, or Firm* — Panitch Schwarze Belisario & Nadel LLP

(57) ABSTRACT

A method for acceptance of blockchain payment at a traditional point of sale device direct to a merchant includes: receiving an authorization request for a fiat payment transaction including a transaction account number, transaction amount, and merchant identifier; identifying blockchain payment acceptance for a transaction account associated with the transaction account number; transmitting an address request to an exchange server including the merchant identifier; receiving a destination address associated with the merchant identifier for a blockchain network from the exchange server; transmitting a new blockchain transaction to a blockchain node in the blockchain network including the destination address and a cryptocurrency amount based on the transaction amount; and transmitting an authorization response for the fiat payment transaction to a payment network for routing to a point of sale device, the authori- (Continued)

zation response including an indication that clearance and settlement of the fiat payment transaction is not required.

16 Claims, 6 Drawing Sheets

(51) Int. Cl.
    *G06Q 20/20*     (2012.01)
    *G06Q 20/34*     (2012.01)
    *G06Q 20/38*     (2012.01)
    *G06Q 20/40*     (2012.01)
    *H04L 9/00*     (2022.01)

(52) U.S. Cl.
    CPC ....... *G06Q 20/204* (2013.01); *G06Q 20/3678* (2013.01); *G06Q 20/381* (2013.01); *G06Q 20/3825* (2013.01); *G06Q 20/3829* (2013.01); *G06Q 20/4014* (2013.01); *G06Q 20/405* (2013.01); *G06Q 20/34* (2013.01); *G06Q 2220/00* (2013.01); *H04L 9/50* (2022.05); *H04L 2209/56* (2013.01)

(56) References Cited

U.S. PATENT DOCUMENTS

| | | | |
|---|---|---|---|
| 10,614,430 B2* | 4/2020 | Armstrong | G06Q 40/04 |
| 2015/0161603 A1* | 6/2015 | Fish | G06Q 30/0261 |
| | | | 705/44 |
| 2016/0148173 A1 | 5/2016 | Kelley | |
| 2016/0342978 A1 | 11/2016 | Davis et al. | |
| 2016/0342994 A1* | 11/2016 | Davis | G06Q 20/0655 |
| 2017/0286951 A1* | 10/2017 | Ignatchenko | G06Q 20/3823 |
| 2017/0357966 A1* | 12/2017 | Chandrasekhar | G06Q 20/06 |
| 2019/0034889 A1 | 1/2019 | Brock et al. | |
| 2019/0034926 A1* | 1/2019 | Davis | G06Q 20/401 |
| 2019/0303920 A1* | 10/2019 | Balaraman | H04L 67/1042 |
| 2020/0027084 A1* | 1/2020 | Groarke | H04L 9/30 |
| 2020/0394620 A1* | 12/2020 | Kim | G06Q 20/0658 |
| 2021/0142297 A1* | 5/2021 | Mathew | G06Q 20/065 |

OTHER PUBLICATIONS

Extended European Search Report, dated Apr. 3, 2024, issued in corresponding European Application No. 21829379.3-1218, 7 pages.

* cited by examiner

METHOD AND SYSTEM FOR MERCHANT ACCEPTANCE OF CRYPTOCURRENCY VIA PAYMENT RAILS

FIELD

The present disclosure relates to acceptance of blockchain payment at a traditional point of sale device, specifically the use of traditional payment rails and point of sale devices while enabling payment via a blockchain transaction directly from consumer to merchant.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. As a result, many consumers may be interested in using blockchain as a payment method for transactions. However, traditionally, merchants have been required to provide new point of sale devices that are interfaced with computing devices that are suitable for accepting blockchain payments, through the merchant's own blockchain wallet. This high barrier for entry has resulted in a minimal number of merchants enabling acceptance of blockchain payments.

Thus, there is a need for a technical system that can enable a consumer to use blockchain to pay for a transaction while utilizing legacy point of sale systems.

SUMMARY

The present disclosure provides a description of systems and methods for acceptance of a blockchain payment at a traditional point of sale device through issuer processing. A fiat payment transaction can proceed as normal, with the consumer presenting a payment card that is read from a legacy point of sale device and an authorization request submitted through payment rails. When the authorization request arrives at the issuer, the issuer can identify that payment via blockchain is possible, and may request blockchain information for the merchant from an exchange server. If the merchant is enabled for receipt of payment via blockchain, the exchange server can provide the information to the issuer, which can then initiate a blockchain transaction for payment to the merchant using cryptocurrency. The transaction is reported back to the point of sale through traditional methods, without settlement having to be performed due to the payment already made directly between consumer and merchant on the blockchain. The result is that payment is made by the consumer via cryptocurrency through their issuer and directly to the merchant, while the merchant and acquirer participate in the transaction using standard devices and systems. Thus, a consumer can pay for a fiat transaction with cryptocurrency while utilizing legacy point of sale devices and systems for merchants, also enabling the merchant to be paid immediately via cryptocurrency, without having to wait for standard processing and settlement.

A method for acceptance of blockchain payment at a traditional point of sale device direct to a merchant account includes: receiving, by a receiver of a processing server, an authorization request for a fiat payment transaction originating from a point of sale device and routed through a payment network, wherein the authorization request includes at least a transaction account number, a transaction amount, and a merchant identifier; identifying, by a processor of the processing server, blockchain payment acceptance for a transaction account associated with the transaction account number; transmitting, by a transmitter of the processing server, an address request to an exchange server, the address request including the merchant identifier; receiving, by the receiver of the processing server, a destination address for an electronic wallet associated with the merchant identifier and a blockchain network from the exchange server; transmitting, by the transmitter of the processing server, a new blockchain transaction to a blockchain node in the blockchain network, the new blockchain transaction including at least the destination address, a cryptocurrency amount based on the transaction amount, a digital signature, and one or more unspent transaction outputs; and transmitting, by the transmitter of the processing server, an authorization response for the fiat payment transaction to the payment network for routing to the point of sale device, wherein the authorization response includes an indication that clearance and settlement of the fiat payment transaction is not required.

A system for acceptance of blockchain payment at a traditional point of sale device direct to a merchant account includes: a payment network; a blockchain network comprised of a plurality of blockchain nodes; a point of sale device; an exchange server; and a processing server, the processing server including a receiver receiving an authorization request for a fiat payment transaction originating from a point of sale device and routed through a payment network, wherein the authorization request includes at least a transaction account number, a transaction amount, and a merchant identifier, a processor identifying blockchain payment acceptance for a transaction account associated with the transaction account number, and a transmitter transmitting an address request to an exchange server, the address request including the merchant identifier, wherein the receiver further receives a destination address for an electronic wallet associated with the merchant identifier and a blockchain network from the exchange server, and the transmitter further transmits a new blockchain transaction to a blockchain node in the blockchain network, the new blockchain transaction including at least the destination address, a cryptocurrency amount based on the transaction amount, a digital signature, and one or more unspent transaction outputs, and an authorization response for the fiat payment transaction to the payment network for routing to the point of sale device, wherein the authorization response includes an indication that clearance and settlement of the fiat payment transaction is not required.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
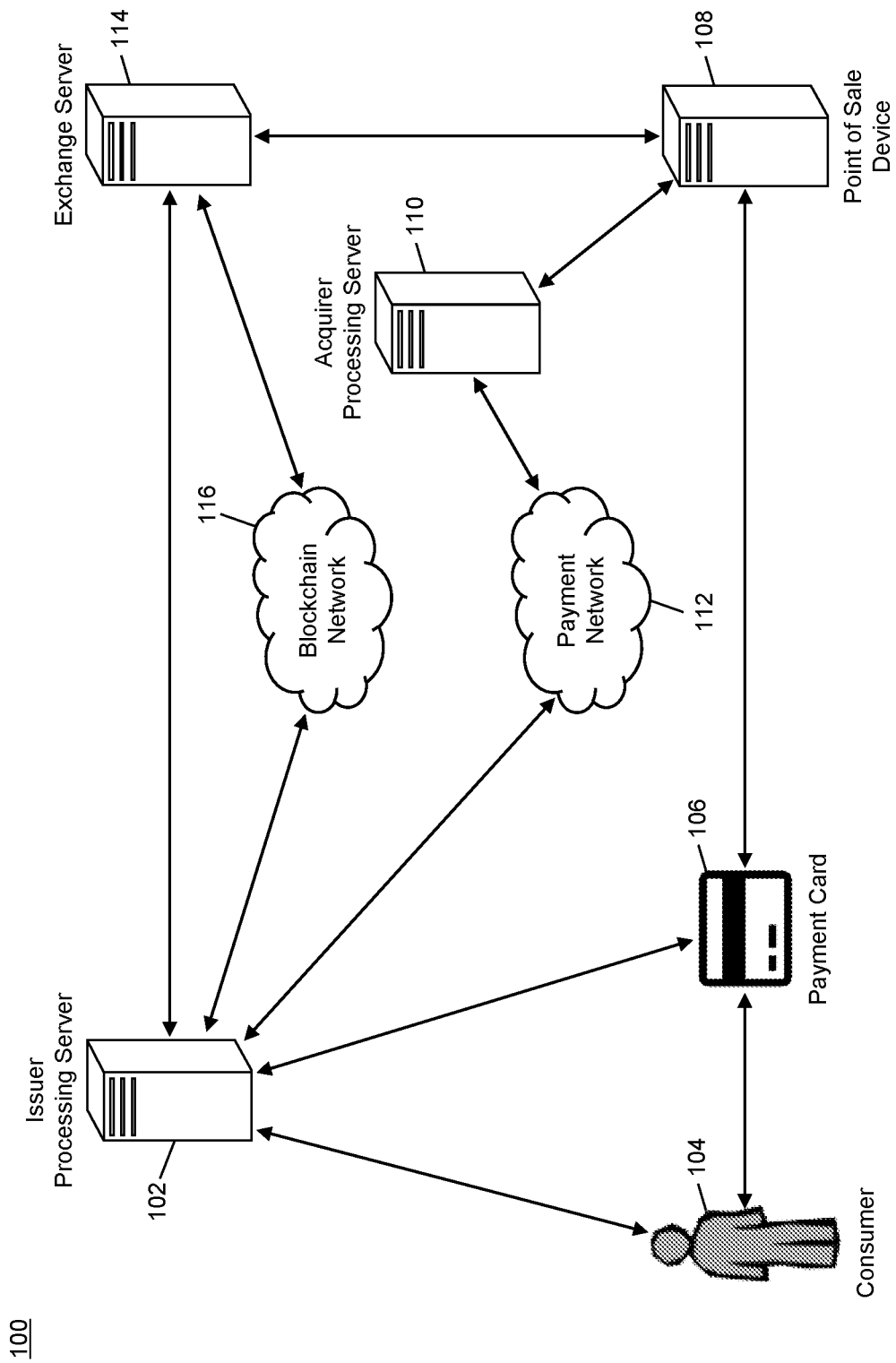
FIG. 1 is a block diagram illustrating a high level system architecture for acceptance of blockchain payments at a traditional point of sale device in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transactions may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Blockchain Payments at a Traditional Point of Sale

FIG. 1 illustrates a system 100 for the use of a blockchain for payment of a fiat payment transaction conducted using a traditional point of sale device and transaction messaging utilizing a card-based payment network.

The system 100 may include an issuer processing server 102, also referred to herein as a "processing server" 102. The issuer processing server 102, discussed in more detail below, may be configured to facilitate the use of a cryptographic currency, also referred to herein as a "cryptocurrency," for payment of a fiat payment transaction submitted through payment rails via a blockchain transaction. In the system 100, an issuing financial institution associated with the issuing processing server 102 may issue a transaction account to a consumer 104. The transaction account may be a fiat transaction account that can be used to fund standard (e.g., for fiat currency) electronic payment transactions via the use of a payment card 106 issued to the consumer 104 that is encoded with payment details for the associated transaction account. The consumer 104 may present the payment card 106 to a point of sale device 108 to fund a fiat payment transaction via the associated transaction account, using traditional transaction processing.

In a traditional, fiat payment transaction, the point of sale device 108 reads the payment details from the payment card 106 using any suitable method, where the payment details may include at least a transaction account number for the associated transaction account. Additional payment details may include, for instance, a name, expiration date, security code, application cryptogram, etc. The point of sale device 108 may provide the payment details and additional transaction data for the payment transaction to an acquirer processing server 110, which may be operated or otherwise associated with an acquiring financial institution, such as one that has issued a transaction account to the merchant of the point of sale device 108 for use in receiving funds as part of fiat payment transactions. The acquirer processing server 110 may generate an authorization request for the fiat payment transaction, where the authorization request is a type of transaction message, which is a specially formatted data message that is formatted for transmission via payment rails and processing via a payment network 112. An authorization request or a transaction message may be formatted pursuant to one or more standards governing the exchange of financial transaction messages, such as the International Organization of Standardization's ISO 8583 or ISO 20022 standards. An authorization request may be a type of a transaction message as designated by a message type indicator included therein. The authorization request may include a plurality of data elements that store data as indicated in the applicable standard(s), such as including the transaction account number, other payment details, a transaction amount, a currency code, a transaction time, a transaction date, a merchant identifier, a point of sale identifier, product data, offer data, reward data, loyalty data, etc.

The authorization request may be submitted to a payment network 112 for processing through payment rails associated therewith. In some cases, the authorization request may be routed through a gateway processor or other intermediate entity between the acquirer processing server 110 and the payment network 112, through the payment rails. The payment network 112 may perform any value-added services with respect to the authorization request, such as account mapping, fraud scoring, etc., and may route the authorization request to the issuer processing server 102 via the payment rails, where the issuer processing server 102 may be identified using the transaction account number. For example, the transaction account number may include an issuer identification number therein, which may be used by the payment network 112 to identify the issuer processing server 102 and route the authorization request thereto.

In a traditional fiat payment transaction, the issuer processing server 102 would identify the transaction account used by the consumer 104, based on the transaction account number, and approve or deny the fiat payment transaction using traditional methods and return an authorization response to the payment network 112 via the payment rails. In the system 100, the issuer processing server 102 may identify the transaction account using the transaction account number and identify that the transaction account is eligible for payment of the fiat payment transaction through a blockchain using a cryptocurrency associated therewith. In the system 100, the consumer 104 may register their transaction account for blockchain payment acceptance with the issuer processing server 102 using any suitable method, such as during issuance of the transaction account or later on, such as via a banking application program, a web page associated with the issuer processing server 102, etc. As part of the registration of the transaction account, the consumer 104 may provide the issuer processing server 102 with a blockchain wallet, discussed in more detail below, for use in cryptocurrency payments or may authorize the issuer processing server 102 to use its own blockchain wallet for cryptocurrency payments, which may be settled with the consumer's transaction account through fiat currency or a cryptocurrency balance.

In some cases, when the issuer processing server 102 determines that the consumer 104 has registered for blockchain payment acceptance, the issuer processing server 102 may request permission for blockchain payment from the consumer 104, such as through a computing device associated with the consumer 104. For example, a short message service message may be transmitted to a computing device of the consumer 104, where the consumer 104 may respond thereto with authorization, or denial, for payment of the fiat payment transaction through cryptocurrency. In other cases, the consumer 104 may provide authorization for blockchain payment prior to initiating the payment transaction with the point of sale device 108, such as through an electronic banking application program on their computing device.

In order to facilitate payment via cryptocurrency, the merchant associated with the point of sale device 108 must be registered to receive payment via cryptocurrency. In the system 100, an exchange server 114 may provide a platform to merchants to register for the receipt of payment via cryptocurrency. The exchange server 114 may be operated by the payment network 112, a blockchain network 116 (discussed in more detail below), an issuer processing server 102, an acquirer processing server 110, or separate entity. To register, the merchant may (e.g., via the point of sale device 108) provide the exchange server 114 with their merchant identifier and a public key of a cryptographic key pair that serves as an electronic blockchain wallet for the merchant, as discussed below. The exchange server 114 may store the data together.

When the issuer processing server 102 identifies that the consumer 104 accepts or requests payment via cryptocurrency, the issuer processing server 102 may electronically transmit a data request to the exchange server 114, where the data request includes the merchant identifier associated with the merchant, such as identified in the received authorization request. The exchange server 114 may receive the data request and identify if the merchant has registered therewith, using the merchant identifier. If the merchant has not registered to accept payment via the blockchain, then the exchange server 114 may inform the issuer processing server 102 accordingly, and the fiat payment transaction may be processed using standard methods and systems. If the merchant has registered for payment acceptance using the blockchain, then the exchange server 114 may generate a recipient blockchain address using the merchant's public key (e.g., identified via the merchant identifier) or as provided by the merchant (e.g., via the point of sale device 108) for use and may provide a response to the issuer processing server's data request with the recipient blockchain address, and any information necessary for identifying the blockchain to be used. For example, if the exchange server 114 has merchants registered therewith that use different blockchains, a network identifier for the associated blockchain network 116 may be included. In addition, exchange rates for exchange between fiat currency and cryptocurrency may be provided. In some cases, the data request may include the transaction amount, where the response may include the equivalent cryptocurrency amount identified by the exchange server 114, such as using an exchange rate provided by the merchant.

Figure 5:
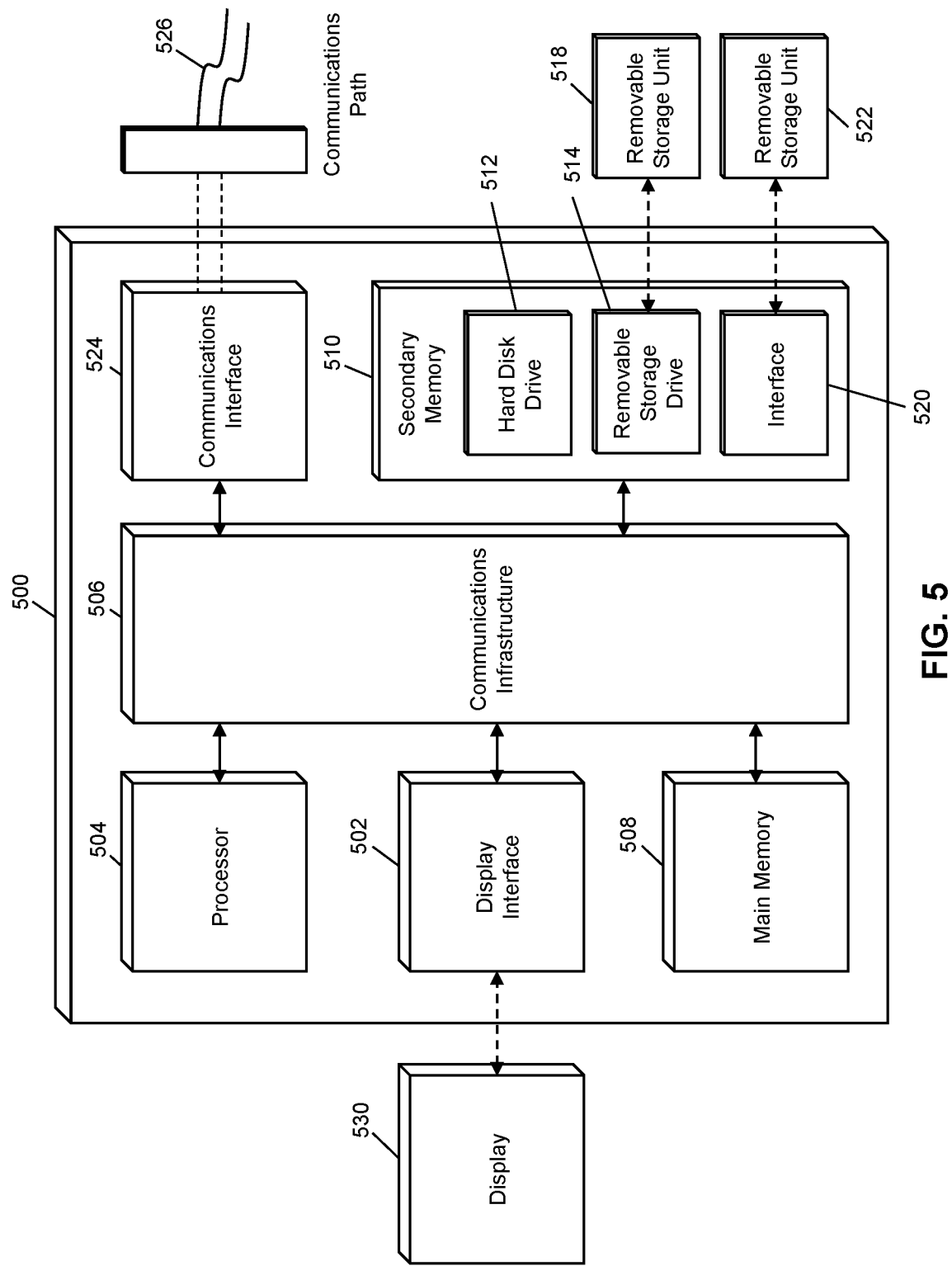
FIG. 5 is a block diagram illustrating a computer system architecture in accordance with exemplary embodiments.

The issuer processing server 112 may receive the blockchain data for the merchant from the exchange server 114, and may then submit a new blockchain transaction to a blockchain network 116 that manages the appropriate cryptocurrency through which the blockchain transaction is to be conducted. The blockchain network 116 may be comprised of a plurality of blockchain nodes. Each blockchain node may be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the payment network 112 may operate one or more nodes of the blockchain network 116. In some cases, the exchange server 114 may be a blockchain node in the associated blockchain network 116.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 116 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 116 using the public key of the cryptographic key pair. In some cases, the term "blockchain wallet" may refer specifically to the private key. In other cases, the term "blockchain wallet" may refer to a computing device (e.g., issuer processing server 102 and point of sale device 108) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., the issuer processing server 102) that is generated using the sender's private key, a blockchain address of the recipient of currency (e.g., the point of sale device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction.

For the traditional processing of a blockchain transaction, such data may be provided to a blockchain node in the blockchain network 116, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 116 before being added to the blockchain and distributed to all of the blockchain nodes in the blockchain network 116 in traditional blockchain implementations. In cases where a blockchain data value may not be related to a blockchain transaction, but instead the storage of other types of data, blockchain data values may still include or otherwise involve the validation of a digital signature.

In the system 100, the issuer processing server 102 may submit a blockchain transaction to a node in the blockchain network 116 for payment of a suitable amount of cryptocurrency (e.g., based on the transaction amount in the fiat payment transaction and the exchange rate provided by the exchange server 114, or as directly provided by the exchange server 114) from a blockchain wallet associated with the consumer's transaction account or the issuer processing server 102 generally for payment to a blockchain wallet of the merchant, such as stored in the point of sale device 108 or other computing device associated with the merchant. The blockchain transaction may include the cryptocurrency amount, the blockchain address for receipt by the merchant, one or more unspent transaction outputs, and a digital signature generated using the private key of the blockchain wallet from which payment is being made. In an exemplary embodiment, the private key and unspent transaction outputs may be stored in an account profile for the consumer's transaction account, such as identified using the transaction account number included in the authorization request routed to the issuer processing server 102 via the payment rails. The node in the blockchain network 116 may receive the blockchain transaction and process the blockchain transaction using traditional methods, such as by confirming the transaction and including it in a new block that is confirmed by other nodes in the blockchain network 116 and then added to the blockchain. As part of the processing of the blockchain transaction, the node may identify a transaction identifier, which is a unique value for the blockchain transaction, which may be returned to the issuer processing server 102 as confirmation of the blockchain transaction. In some embodiments, the issuer processing server 102 may await posting of the blockchain transaction in the blockchain and identify the transaction identifier therefrom.

After successful processing of the blockchain transaction, the issuer processing server 102 may provide the exchange server 114 with a notification of the successful cryptocurrency payment thereto, such as by providing the transaction identifier to the exchange server 114. With successful processing of the cryptocurrency payment to the exchange server 114, the issuer processing server 102 may return an authorization response to the payment network 112 for the fiat payment transaction. The authorization response may be a transaction message that includes a message type indicator indicative of an authorization response, where the data element stored therein may include a data element that stores a response code indicating that clearance and settlement of the fiat payment transaction is not required (e.g., due to the payment being fulfilled by blockchain). In some cases, the transaction identifier for the blockchain transaction may be included in the authorization response. In such cases, the transaction identifier may be stored in a data element that is reserved in the applicable standard(s) for private use, such as data element 123 in ISO 8583. The response code may be any code suitable for indicating that the transaction is complete (e.g., not denied), but that clearance and settlement is not required, such as response codes 01 or 85 in ISO 8583. The payment network 112 may receive the authorization response from the issuer processing server 102 via the payment rails and may route the authorization response back to the acquirer processing server 102 using the payment rails.

The acquirer processing server 110 may receive the authorization response and provide a notification (e.g., as the authorization response or separate therefrom) to the point of sale device 108 that the fiat payment transaction was approved. The merchant may then provide the consumer 104 with the transacted—for goods or services.

In some embodiments, the exchange server 114 may electronically transmit a notification message to the point of sale device 108 after successful completion of the blockchain transaction. For instance, when the issuer processing server 102 provides the transaction identifier for the blockchain transaction to the exchange server 114, the exchange server 114 may electronically transmit a notification to the point of sale device 108 indicating that payment via cryptocurrency from the consumer 104 to the merchant's blockchain wallet was completed successfully. In some cases, the transaction identifier or other data parsed from the blockchain data value in the blockchain may be included therein. In such embodiments, an authorization response may not be returned to the point of sale device 108 by the issuer processing server 102. In other embodiments, the point of sale device 108 may receive the authorization response having a response code indicating no clearance or settlement should be performed, but may provide precedence to the result received from the exchange server 114, which indicates that the alternative, blockchain payment transaction was successful, such as to ensure that the consumer 104 receives their transacted—for goods or services. Following completion of the processing of the fiat payment transaction (through payment via blockchain), settlement may be performed between the issuing financial institution and acquiring financial institution, if necessary.

The result is that payment may be made for a fiat payment transaction through a cryptocurrency, while the point of sale device 108 and acquirer processing server 110 perform standard processes for a fiat payment transaction using standard devices and systems. Thus, payment can be made using a cryptocurrency on legacy point of sale devices 108 and through legacy acquirer processing servers 110 using the payment rails of the payment network 112. The consumer 104 is free to use their payment card 106 issued on their fiat transaction account for cryptocurrency payments and may do so at every merchant if the merchant is configured to accept such payments. Accordingly, the methods and systems discussed herein solve the problems of merchants and acquirers accepting payment via cryptocurrency by enabling the consumer to pay with cryptocurrency while using legacy systems, and with minimal involvement by the merchant to receive cryptocurrency payments.

Issuer Processing Server

Figure 2:
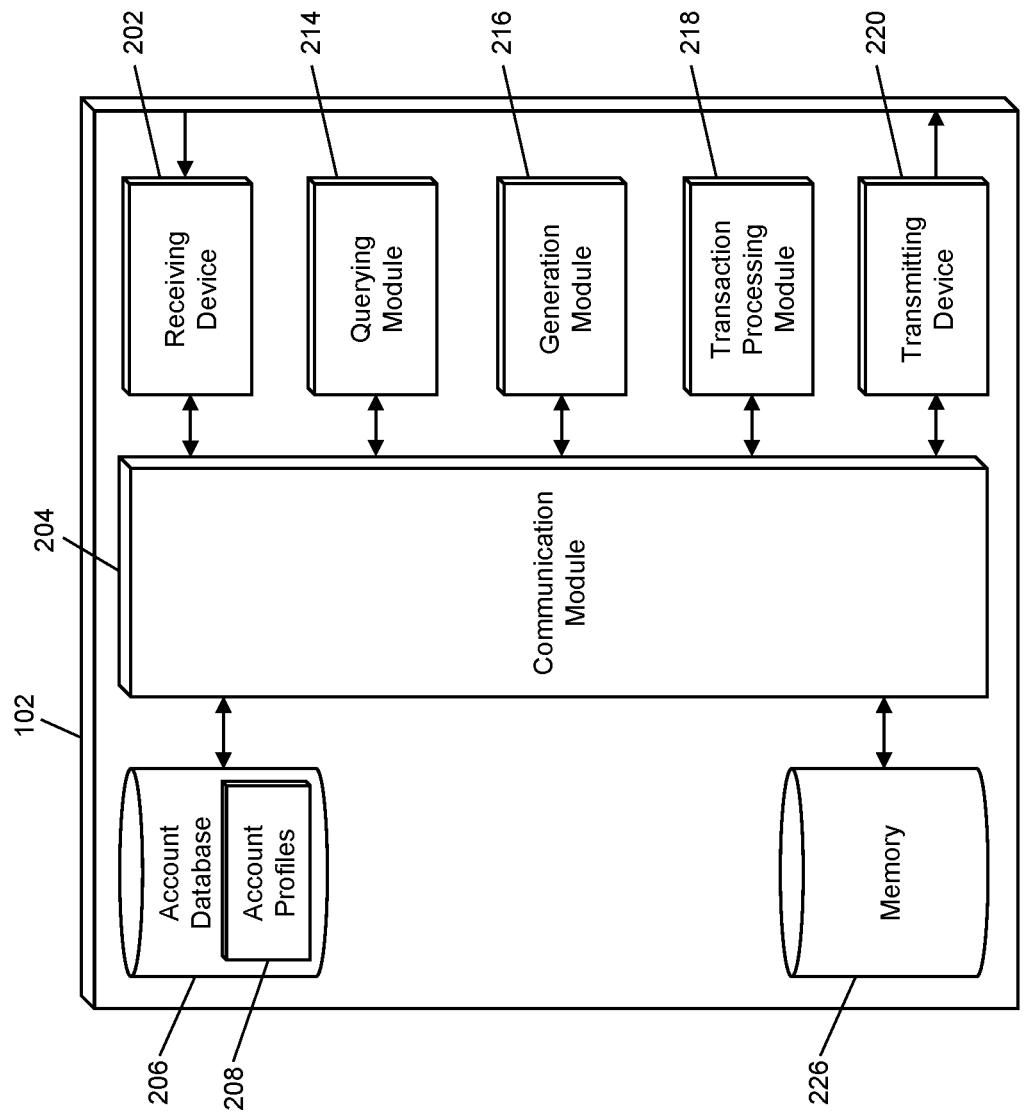
FIG. 2 is a block diagram illustrating the processing server of the system of FIG. 1 for acceptance of blockchain payments in accordance with exemplary embodiments.

FIG. 2 illustrates an embodiment of the issuer processing server 102 in the system 100. It will be apparent to persons having skill in the relevant art that the embodiment of the issuer processing server 102 illustrated in FIG. 2 is provided as illustration only and may not be exhaustive to all possible configurations of the issuer processing server 102 suitable for performing the functions as discussed herein. For example, the computer system 500 illustrated in FIG. 5 and discussed in more detail below may be a suitable configuration of the issuer processing server 102. In some cases, payment networks 112, exchange servers 114, blockchain networks 116, and acquirer processing servers 110 may include components as illustrated in FIG. 2 and be configured to perform the functions discussed herein.

The issuer processing server 102 may include a receiving device 202. The receiving device 202 may be configured to receive data over one or more networks via one or more network protocols. In some instances, the receiving device 202 may be configured to receive data from payment networks 112, exchange servers 114, blockchain networks 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 112 that are transmitted via payment rails and superimposed or otherwise encoded with transaction messages, such as authorization requests for fiat payment transactions. The receiving device 202 may also be configured to receive data signals electronically transmitted by exchange servers 114, which may be superimposed or otherwise encoded with exchange rates and address information. The receiving device 202 may be further configured to receive data signals electronically transmitted by blockchain networks 116, such as via blockchain nodes included therein, that may be superimposed or otherwise encoded with transaction identifiers or other data regarding the processing of blockchain transactions.

The issuer processing server 102 may also include a communication module 204. The communication module 204 may be configured to transmit data between modules, engines, databases, memories, and other components of the issuer processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the issuer processing server 102 and external components of the issuer processing server 102, such as externally connected databases, display devices, input devices, etc. The issuer processing server 102 may also include a processing device. The processing device may be configured to perform the functions of the issuer processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, transaction processing module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. An account profile 208 may include, for instance, a transaction account number for the related transaction account, and other payment details associated therewith, blockchain wallet data (e.g., a private key and public key for a cryptographic key pair, unspent transaction outputs, balance data), and any other data used in the processing of fiat and cryptocurrency payment transactions, such as balances, credit information, reward data, etc.

The issuer processing server 102 may include a querying module 214. The querying module 214 may be configured to execute queries on databases to identify information. The querying module 214 may receive one or more data values or query strings, and may execute a query string based thereon on an indicated database, such as the account database 206 of the issuer processing server 102 to identify information stored therein. The querying module 214 may then output the identified information to an appropriate engine or module of the issuer processing server 102 as necessary. The querying module 214 may, for example, execute a query on the account database 206 to identify an account profile 208 related to a fiat payment transaction using the transaction account number included in a received authorization request, such as to determine if the consumer 104 has accepted payment via blockchain or for approval or denial of the fiat payment transaction based on balance and credit information.

The issuer processing server 102 may also include a generation module 216. The generation module 216 may be configured to generate data for use by the issuer processing server 102 in performing the functions discussed herein. The generation module 216 may receive instructions as input, may generate data based on the instructions, and may output the generated data to one or more modules of the issuer processing server 102. For example, the generation module 216 may be configured to generate new transaction messages, generate digital signatures for new blockchain transactions, generate new blockchain transactions, generate cryptocurrency amounts based on fiat transaction amounts and exchange rates, etc.

The issuer processing server 102 may also include a transaction processing module 218. The transaction processing module 218 may be configured to perform the functions of the issuer processing server 102 related to the processing of payment transactions, including fiat payment transactions and blockchain transactions. The transaction processing module 218 may, for example, determine approval or denial of a payment transaction, such as based on credit and balance information, determine a fraud score for a payment transaction, determine approval or denial based on fraud or other factors and criteria, perform account mapping, identify routing information for transaction messages, etc.

The issuer processing server 102 may also include a transmitting device 220. The transmitting device 220 may be configured to transmit data over one or more networks via one or more network protocols. In some instances, the transmitting device 220 may be configured to transmit data to payment networks 112, exchange servers 114, blockchain networks 116, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to payment networks 112 that are superimposed or otherwise encoded with transaction messages, such as authorization responses, for fiat payment transactions, which may be transmitted using payment rails associated with the payment network 112. The transmitting device 220 may also be configured to electronically transmit data signals to exchange servers 114, which may be superimposed or otherwise encoded with data requests, which may include a merchant identifier and request exchange rate and blockchain address data therefrom. The transmitting device 220 may be further configured to receive data signals electronically transmitted by blockchain networks 116, such as from nodes thereof, that may be superimposed or otherwise encoded with notifications and other data regarding blockchain transactions processed thereby.

The issuer processing server 102 may also include a memory 226. The memory 226 may be configured to store data for use by the issuer processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the issuer processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, cryptographic keys, salts, nonces, communication information for blockchain nodes and blockchain networks 116, address generation and validation algorithms, digital signature generation and validation algorithms, cryptocurrency exchange rates, transaction message formatting standards, payment rail routing data, etc.

Process for Acceptance of Blockchain Payments

Figure 3A:
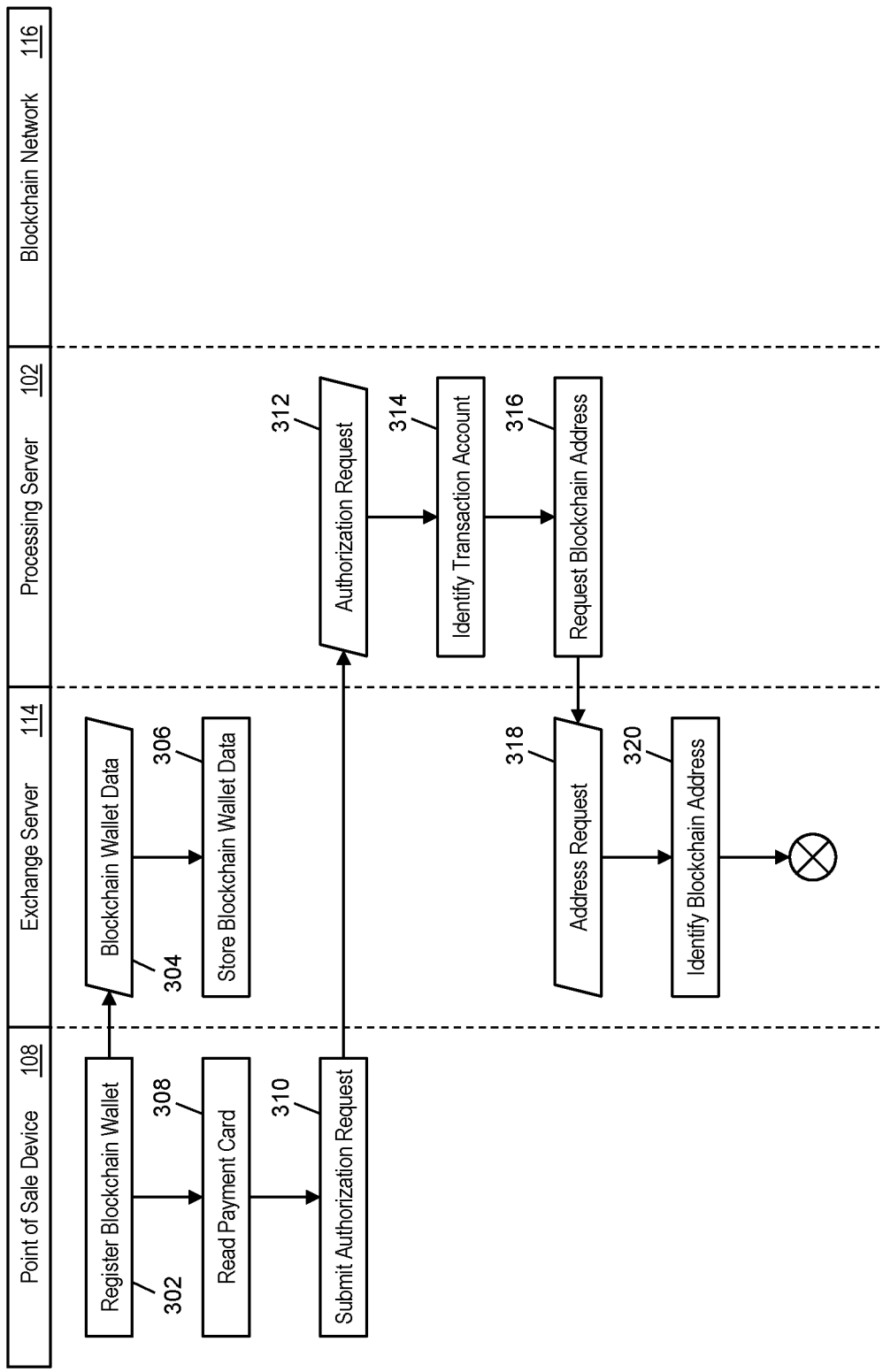
FIGS. 3A and 3B are a flow diagram illustrating a process for acceptance of blockchain payments at a traditional point of sale device in the system of FIG. 1 in accordance with exemplary embodiments.
Figure 3B:
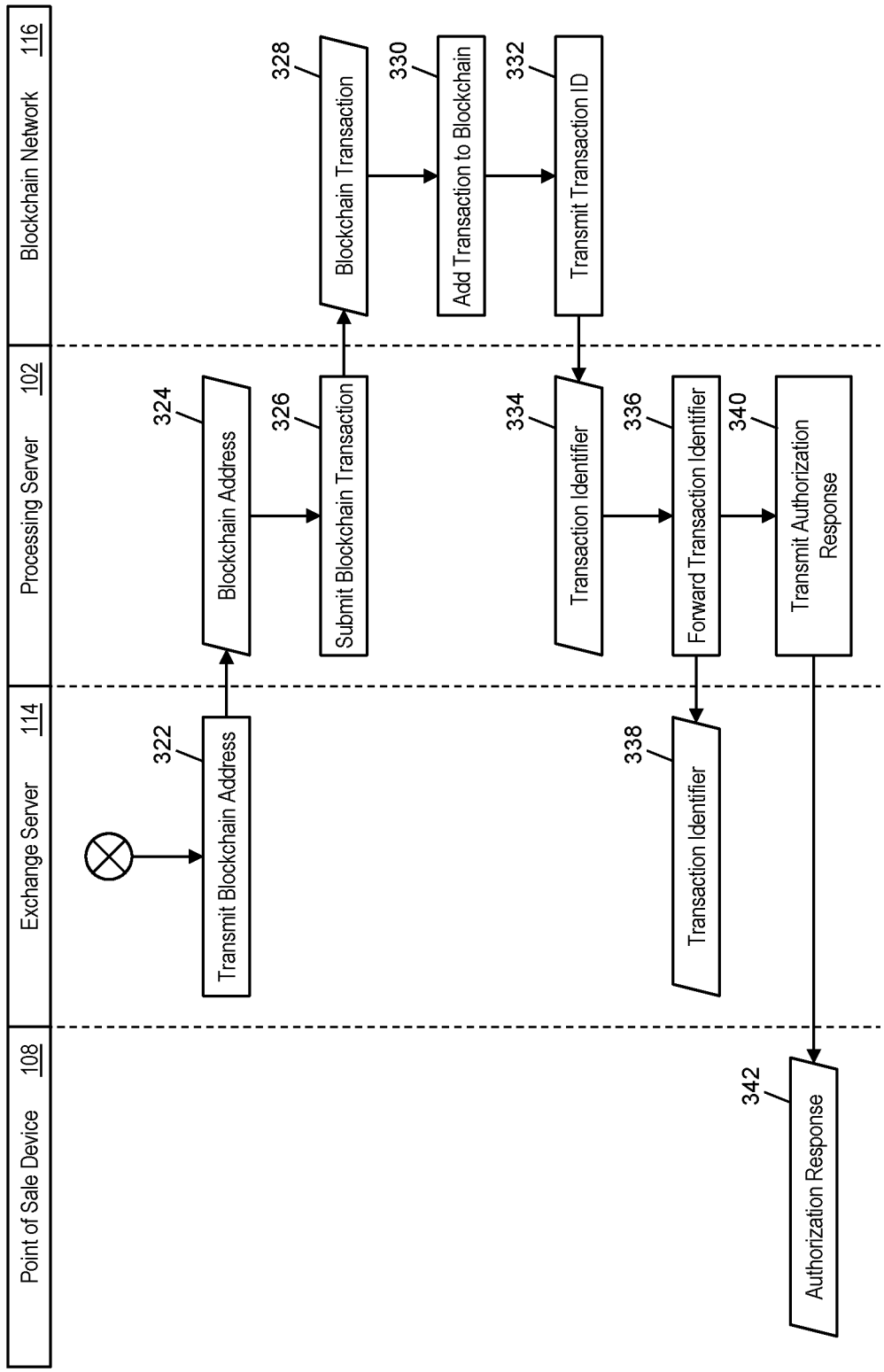

FIGS. 3A and 3B illustrates a process in the system 100 for the acceptance of blockchain payment for a fiat payment transaction at a traditional point of sale device 108 through processing by the issuer processing server 102 and use of an exchange server 114.

In step 302, the point of sale device 108 may register itself as a blockchain wallet with the exchange server 114 for the receipt of alternative payments for a fiat payment transaction through cryptocurrency in a blockchain network 116. As part of the registration, the point of sale device 108 may provide a merchant identifier and public key of a blockchain wallet to the exchange server 114. In step 304, the exchange server 114 may receive the merchant identifier and public key. In step 306, the exchange server 114 may store the merchant identifier and public key therein, such as in a profile associated with the merchant and/or point of sale device 108.

In step 308, the point of sale device 108 may read a payment card 106 presented by the consumer 104 for use in funding a fiat payment transaction. As part of the reading of the payment card 106, the point of sale device 108 may obtain at least a transaction account number stored or otherwise encoded therein, and any other payment details that may be used in the processing of a fiat payment transaction. In step 310, the point of sale device 108 may submit an authorization request, or data for inclusion therein, to the issuer processing server 102 via an acquirer processing server 110 and the payment network 112. The authorization request may be formatted pursuant to one or more standards and include at least a transaction amount, the transaction account number, and a merchant identifier associated with the point of sale device 108.

In step 312, the receiving device 202 of the issuer processing server 102 may receive the authorization request, which may be routed to the issuer processing server 102 by the payment network 112 using payment rails thereof. In step 314, the querying module 214 of the issuer processing server 102 may execute a query on the account database 206 thereof to identify an account profile 208 stored therein that is associated with the transaction account used by the consumer 104, identified using the transaction account number included in the authorization request. The account profile 208 may indicate that the consumer 104 has accepted payment via blockchain. In step 316, the transmitting device 220 of the issuer processing server 102 may electronically transmit a data request to the exchange server 114 using a suitable communication network and method, where the data request includes the merchant identifier included in the received authorization request.

In step 318, the exchange server 114 may receive the data request with the merchant identifier included therein. In step 320, the exchange server 114 may identify that the merchant associated with the merchant identifier has previously registered to accept blockchain payments and provided their public key and may generate a recipient blockchain address using the public key. In step 322, the exchange server 114 may electronically transmit the generated recipient blockchain address back to the issuer processing server 102 as a response to the data request. In some cases, the response may also include an exchange rate or cryptocurrency amount and may, in some instances, include a network identifier associated with the blockchain network 116. In step 324, the receiving device 202 of the issuer processing server 102 may receive the data request.

In step 326, the transmitting device 220 of the issuer processing server 102 may electronically transmit a new blockchain transaction to a node in the blockchain network 116. The new blockchain transaction may include at least a digital signature (e.g., generated by the generation module 216 of the issuer processing server 102 using a private key in the identified account profile 208), one or more unspent transaction outputs, the recipient blockchain address, and a cryptocurrency amount based on the transaction amount. In step 328, the blockchain network 116 may receive the new blockchain transaction. In step 330, the blockchain node may confirm the new blockchain transaction and include it in a new block that is generated, confirmed by other nodes in the blockchain network 116, and added to the blockchain. As part of the addition of the new blockchain transaction to the blockchain, a transaction identifier for the blockchain transaction may be identified and included in the corresponding blockchain data value. In step 332, the blockchain network 116 may provide a notification of successful processing of the blockchain transaction to the issuer processing server 102, which may include the transaction identifier.

In step 334, the receiving device 202 of the issuer processing server 102 may receive the transaction identifier from the blockchain network 116. In step 336, the transmitting device 220 of the issuer processing server 102 may electronically transmit the transaction identifier for the blockchain data value to the exchange server 114 as a reporting of the successful processing of the blockchain transaction. The exchange server 114 may receive the transaction identifier, in step 338. In some cases, the exchange server 114 may then transmit a notification to the point of sale device 108 regarding successful payment for the fiat payment transaction via the blockchain transaction, and may include the transaction identifier or other data. In step 340, the transmitting device 220 of the issuer processing server 102 may electronically transmit an authorization response for the fiat payment transaction to the point of sale device 108, as routed through the payment network 112 and the payment rails thereof. In step 342, the point of sale device 108 may receive the authorization response. The authorization response may be formatted using the same standard(s) as the authorization request and include a response code indicating that the transaction is complete and that clearance and settlement is unnecessary, such as response codes 01 or 85 in ISO 8583. The merchant may then finalize the transaction with the consumer 104 while being assured of payment via the blockchain transaction.

Exemplary Method for Acceptance of Blockchain Payment

Figure 4:
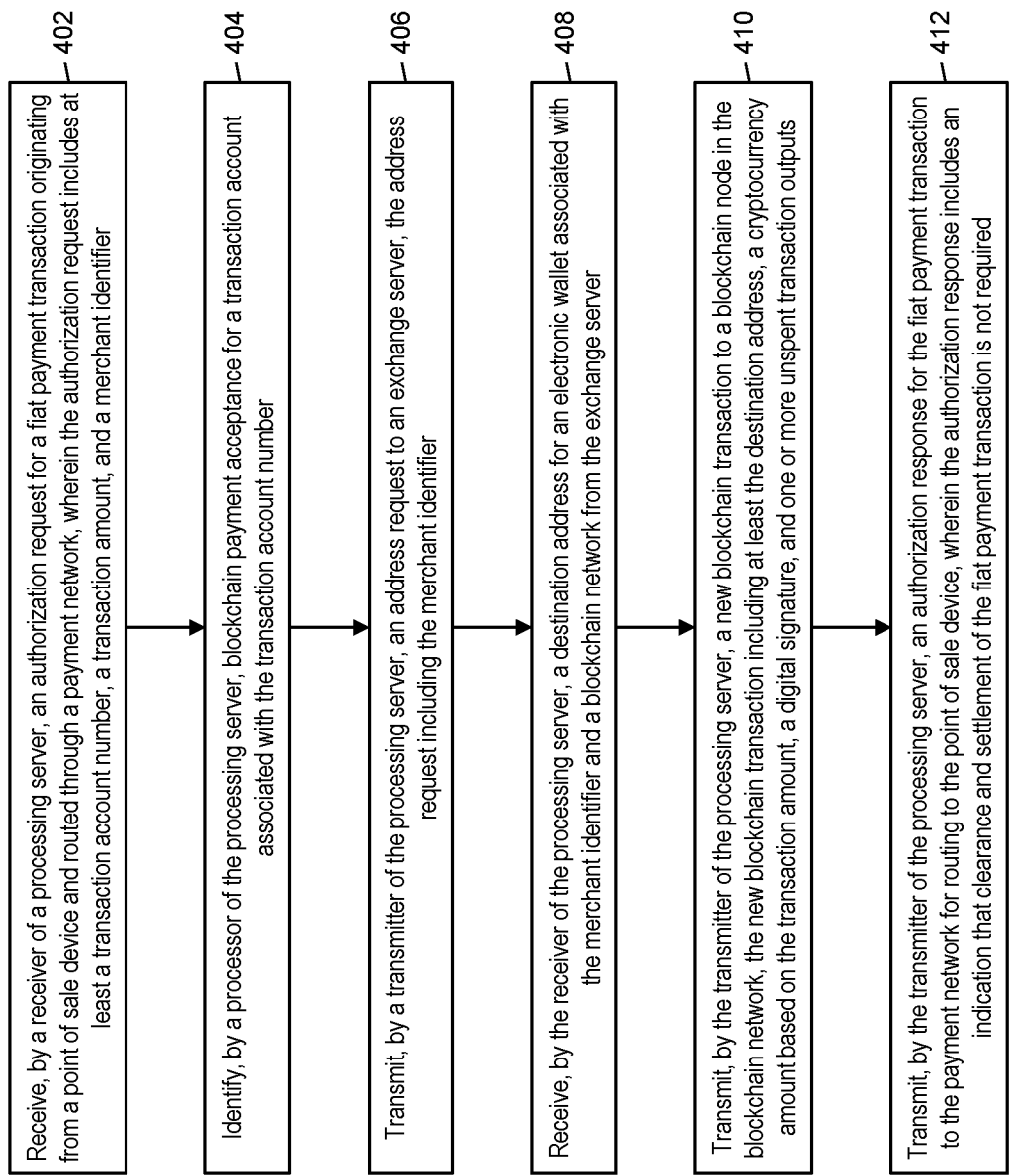
FIG. 4 is a flow chart illustrating an exemplary method for acceptance of blockchain payment at a traditional point of sale device in accordance with exemplary embodiments.

FIG. 4 illustrates a method 400 for the acceptance of payment via blockchain for a fiat payment transaction at a traditional point of sale device direct to a merchant through the use of an exchange server.

In step 402, an authorization request for a fiat payment transaction originating from a point of sale device (e.g., point of sale device 108) and routed through a payment network (e.g., payment network 112) may be received by a receiver (e.g., receiving device 202) of a processing server (e.g., issuer processing server 102), wherein the authorization request includes at least a transaction account number, a transaction amount, and a merchant identifier. In step 404, blockchain payment acceptance may be identified for a transaction account associated with the transaction account number by a processor (e.g., querying module 214) of the processing server. In step 406, an address request may be transmitted by a transmitter (e.g., transmitting device 220) of the processing server to an exchange server (e.g., exchange server 114), the address request including the merchant identifier.

In step 408, a destination address may be received by the receiver of the processing server for an electronic wallet associated with the merchant identifier and a blockchain network from the exchange server. In step 410, a new blockchain transaction may be transmitted by the transmitter of the processing server to a blockchain node in the blockchain network, the new blockchain transaction including at least the destination address, a cryptocurrency amount based on the transaction amount, a digital signature, and one or more unspent transaction outputs. In step 412, an authorization response for the fiat payment transaction may be transmitted by the transmitter of the processing server to the payment network for routing to the point of sale device, wherein the authorization response includes an indication that clearance and settlement of the fiat payment transaction is not required.

In one embodiment, the method 400 may further include identifying, by the processor of the processing server, a private key of a cryptographic key pair; and generating, by the processor of the processing server, the digital signature using the private key. In some embodiments, the authorization response may be formatted pursuant to a standard governing the exchange of financial transaction messages. In a further embodiment, the standard may be ISO 8583. In another further embodiment, the response code may be one of 01 and 85.

In one embodiment, the method 400 may also include transmitting, by the exchange server, a notification message to the point of sale device indicating successful processing of the blockchain transaction. In some embodiments, the method 400 may further include: receiving, by the receiver of the processing server, a transaction identifier from the blockchain node; and transmitting, by the transmitter of the processing server, the transaction identifier to the exchange server. In one embodiment, the exchange rate may be included with the destination address and the cryptocurrency amount may be further based on the exchange rate.

Computer System Architecture

FIG. 5 illustrates a computer system 500 in which embodiments of the present disclosure, or portions thereof, may be implemented as computer-readable code. For example, the issuer processing server 102, acquirer processing server 110, payment network 112, exchange server 114, and blockchain network 116 of FIG. 1 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for acceptance of a blockchain payment at a traditional point of sale device direct to a merchant account. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method using a processing server comprising an account database, a receiver and a transmitter for acceptance of blockchain payment at a traditional point of sale device of a merchant, comprising:
   receiving, by the processing server via the receiver, an authorization request for a fiat payment transaction from a point of sale device of the merchant via a payment network, wherein the fiat payment transaction is initiated by a user, wherein the authorization request includes at least a transaction account number of the user, a transaction amount in a fiat currency, and a merchant identifier of the merchant;
   identifying, by the processing server, blockchain payment acceptance for a transaction account of the user associated with the transaction account number included in the authorization request;
   in response to identifying the blockchain payment acceptance for the transaction account, transmitting, by the processing server via the transmitter, an address request to an exchange server, the address request including the merchant identifier;
   based on the received merchant identifier included in the address request, generating, by the exchange server, a recipient blockchain address using a merchant public key associated with a merchant blockchain wallet;
   sending, by the exchange server to the processing server, a response, wherein the response comprises a destination blockchain address and a network identifier of the blockchain network, wherein the destination blockchain address is the recipient blockchain address associated with the merchant blockchain wallet;
   receiving, by the processing server via the receiver, the response from the exchange server;
   based on the received response, transmitting, by the processing server via the transmitter, a new blockchain transaction to a blockchain node in the blockchain network, the new blockchain transaction including at least the recipient blockchain address, a cryptocurrency amount based on the transaction amount and an exchange rate provided by the exchange server, a digital signature, and one or more of the unspent transaction outputs, wherein the blockchain node processes the new blockchain transaction by including it in a new block that is confirmed by other nodes in the blockchain network; and
   transmitting, by the processing server via the transmitter, an authorization response for the fiat payment transaction to the payment network for routing to the point of sale device, wherein the authorization response includes a response code indicating that clearance and settlement of the fiat payment transaction is not required.

2. The method of claim 1, further comprising:
   identifying, by the processor of the processing server, a private key of the cryptographic key pair; and
   generating, by the processor of the processing server, the digital signature using the private key.

3. The method of claim 1, wherein the authorization response is formatted pursuant to a standard governing the exchange of financial transaction messages.

4. The method of claim 3, wherein the standard is ISO 8583.

5. The method of claim 1, wherein the response code is one of 01 and 85.

6. The method of claim 1, further comprising:
   transmitting, by the exchange server, a notification message to the point of sale device indicating successful processing of the new blockchain transaction.

7. The method of claim 1, further comprising:
   receiving, by the processing server via the receiver, a transaction identifier associated with the new blockchain transaction from the blockchain node; and
   transmitting, by the processing server via the transmitter, the transaction identifier associated with the new blockchain transaction to the exchange server.

8. The method of claim 1, wherein the exchange rate is included with the recipient blockchain address.

9. A system for acceptance of blockchain payment at a traditional point of sale device of a merchant, comprising:
a payment network;
a blockchain network comprised of a plurality of blockchain nodes;
a point of sale device;
an exchange server; and
a processing server comprising a processor, a receiver, and a transmitter, wherein the processing server is configured to:
receive, via the receiver, an authorization request for a fiat payment transaction from a point of sale device of the merchant via the payment network, wherein the authorization request includes at least a transaction account number of the user, a transaction amount in a fiat currency, and a merchant identifier of the merchant;
identify, via the processor, blockchain payment acceptance for a transaction account of the user that is associated with the transaction number included in the authorization request;
transmit, via the transmitter, in response to the processor identifying the blockchain payment acceptance for the transaction, an address request to the exchange server, the address request including the merchant identifier, wherein the exchange server is in bi-directional communication with the processing server, a plurality of blockchain networks, and the point of sale device, and wherein said exchange server generates a recipient blockchain address for an electronic wallet associated with the merchant using a public key of a cryptographic key pair of the merchant,
wherein the processing server is further configured to:
receive, via the receiver, (i) the recipient blockchain address, generated by the exchange server, and (ii) a network identifier for a blockchain network used by the merchant, and
transmit, via the transmitter, a new blockchain transaction to a blockchain node in the blockchain network, the new blockchain transaction including at least the recipient blockchain address, a cryptocurrency amount a cryptocurrency amount based on the transaction amount in the fiat currency and an exchange rate provided by the exchange server, a digital signature, and one or more unspent transaction outputs, wherein the blockchain node processes the new blockchain transaction by including it in a new block that is confirmed by other nodes in the blockchain network, and
transmit, via the transmitter, an authorization response for the fiat payment transaction to the payment network for routing to the point of sale device, wherein the authorization response includes a response code indicating that clearance and settlement of the fiat payment transaction is not required.

10. The system of claim 9, wherein the processing server, via the processor, is further configured to:
identify the private key of the cryptographic key pair, and
generate the digital signature using the private key.

11. The system of claim 9, wherein the authorization response is formatted pursuant to a standard governing the exchange of financial transaction messages.

12. The system of claim 11, wherein the standard is ISO 8583.

13. The system of claim 9, wherein the response code is one of 01 and 85.

14. The system of claim 9, wherein the exchange server transmits a notification message to the point of sale device indicating successful processing of the new blockchain transaction.

15. The system of claim 9, wherein the processing server is further configured to:
receive, via the receiver, a transaction identifier associated from the blockchain node, and
transmit, via the transmitter, the transaction identifier to the exchange server.

16. The system of claim 9, wherein the exchange rate is included with the recipient blockchain address.

* * * * *